UNITED STATES PATENT OFFICE.

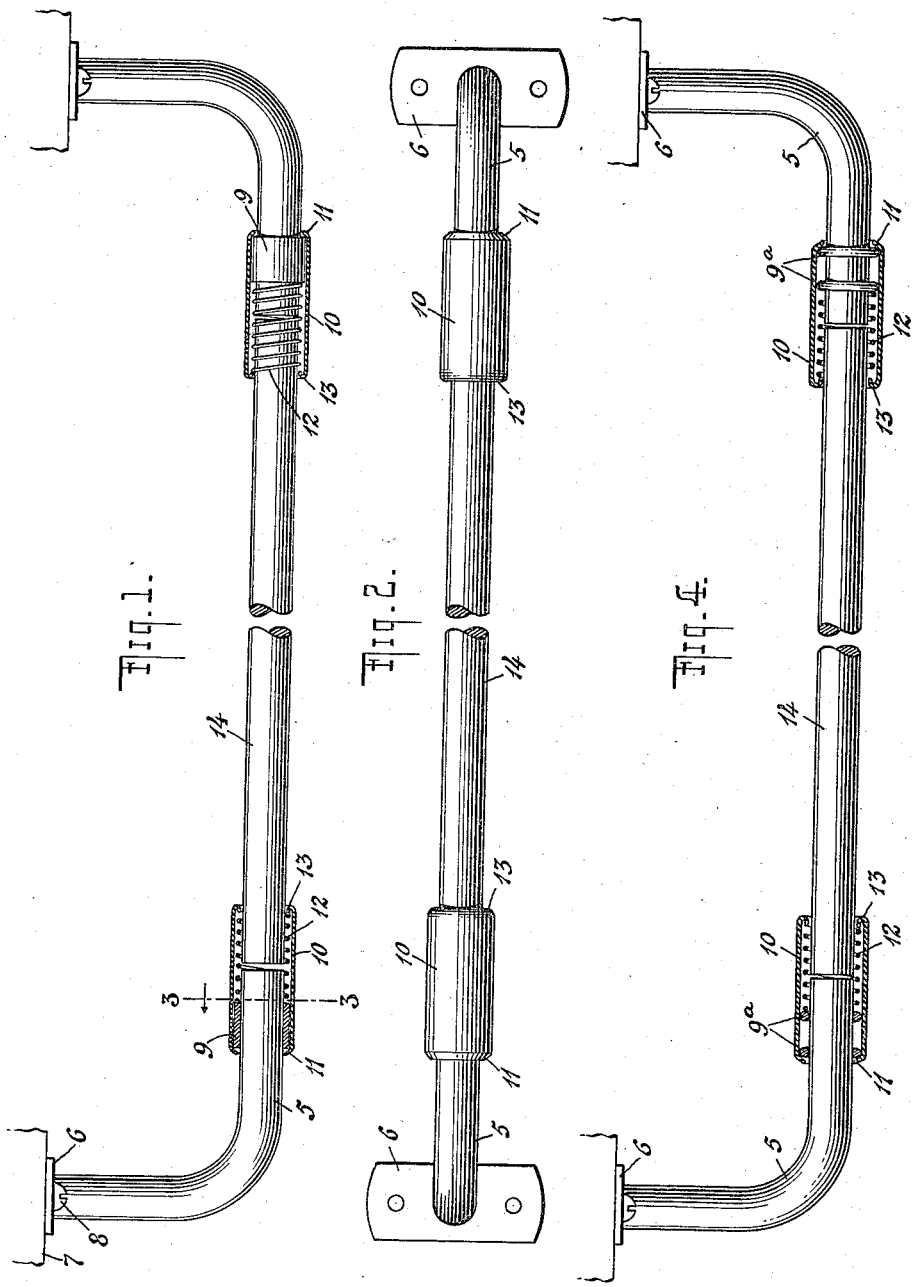

SIDNEY C. HILLS, OF TORRINGTON, CONNECTICUT, ASSIGNOR TO THE TURNER & SEYMOUR MFG. CO., OF TORRINGTON, CONNECTICUT, A CORPORATION OF CONNECTICUT.

BRACKET.

1,279,543.      Specification of Letters Patent.      Patented Sept. 24, 1918.

Application filed March 3, 1916. Serial No. 81,772.

*To all whom it may concern:*

Be it known that I, SIDNEY C. HILLS, a citizen of the United States, and resident of Torrington, county of Litchfield, State of Connecticut, have invented a certain new and useful Improvement in Brackets, of which the following is a specification.

My invention relates to brackets of the kind generally used for supporting curtain rods and has to do more particularly with that type of such brackets commonly known as spring brackets. The object of my improvement is to simplify brackets of this description by reducing the number of parts to a minimum, to reduce the cost of manufacture and to improve the outward appearance thereof and to produce a bracket which is of maximum strength and readily operated. A further purpose of my invention is to avoid the necessity for grooving the parts of the bracket which is necessary in existing brackets of the type in question and to produce an arrangement in which looseness and wabbling of the movable sleeve forming part of such brackets is avoided. Other objects of my improvement will appear from the description hereinafter and the features of novelty will be pointed out in the appended claims.

In the accompanying drawings, which illustrate examples of my invention, Figure 1 is a plan view of one form of my improved bracket partly in section; Fig. 2 is a front view thereof; Fig. 3 is a cross-section on the line 3—3 of Fig. 1 and Fig. 4 is a plan view, partly in section, of another form of my improved bracket.

As shown in the drawings the main member or post 5 is formed with members extending at substantially right angles to each other and provided at one end with a plate or the like 6 which may be secured to a window casing or the like 7, by means of screws or other fastening means 8 to secure said brackets in operative position as shown for instance in Fig. 1. It will be apparent that the said main member or post 5 may be of any other approved design or form than that shown and that the same may be secured to the casing 7 in any desired manner other than that illustrated. In their operative positions the free ends of the main members or posts 5 project toward each other as shown in the drawings. In the form illustrated in Figs. 1, 2 and 3 the said posts 5 are provided with collars 9 which are located at a distance from said free ends and are rigidly secured or fixed in position on said posts in any suitable manner as for instance by spot welding or by means of projections extending in a radial direction from the collars into the posts or vice versa as desired. This collar 9 thus forms an annular enlargement on the exterior surface of the post 5, it being apparent that if desired the same results may be obtained by forming the said annular enlargement integrally with the post in any well known way. In any case the collar 9 or its equivalent is of appreciable width in an axial direction, and engages the inner surface of an axial slidable sleeve 10 so as to form a bearing surface therefor, the axial sliding movement of said sleeve 10 in and outward direction being arrested in any suitable manner as by turning the one end of said sleeve inward to form an annular flange as indicated at 11. In addition to its other functions the collar 9 forms an abutment for one end of a coil spring 12 surrounding the post 5 and located interiorly of the sleeve 10, the opposite end of said spring being in engagement with the inwardly extending flange 13 formed at the outer end of said sleeve 10. The said spring 12 thus normally tends to maintain and return said sleeve in and to its outward position, the parts being so located and proportioned that in this position the sleeve projects beyond the free end of the post 5 and forms a socket for the accommodation of the opposed end of a curtain rod 14. The latter is combined with the brackets in the usual manner by sliding the sleeves 10 on the posts 5 against the tension of the springs 12 and after the rod 14 has been brought into proper registry with said brackets releasing said sleeves 10 which under the influence or pressure of the springs 12 will thus be returned to normal position so as to extend over the opposite ends of said rod 14. In the final operative position of the parts the ends of said rod are thus located within the sleeves and are supported thereby as shown in Figs. 1 and 2.

In the form shown in Fig. 4 the collar 9 is replaced by rings or wires $9^a$ located in pairs on each bracket near the free end of the post $5^a$. The said rings or wires $9^a$ are spaced apart and are rigidly fixed upon the rod in any suitable manner, this form of my improvement being otherwise the same as the one first described.

It will be seen in both of the illustrated forms which as before stated are only examples, that the collar 9 or wires 9ª or their equivalents form bearings on which the sleeves 10 are slidable in an axial direction. Owing to the fact that a considerable portion of the inner surface of the sleeves 10 is engaged by said collars, wires or the like, or because said inner surface is engaged thereby at points spaced from each other, the sliding movements of the sleeves thereon are firm and true and wabbling or looseness of the latter is avoided. In addition to this my improved arrangement further secures the sleeves against any material movements in any direction transverse or at an angle to the axes of said sleeves and thus provides a firm and rigid support for the rod 14. These results are easily attained in my improved construction owing to the fact that the employment of a collar or its equivalent in combination with a sleeve make it possible to obtain more exact dimensions and a better coöperative relation between these parts than is possible for instance in constructions in which either the sleeve or the bracket or both are provided with grooves whereby projections are formed. The operations necessary to produce these grooves are of such a nature as to prevent any real accuracy in those parts which are intended to form a bearing for the sleeve. In addition to this the number of parts comprising my improvement are reduced to a minimum so that the cost of production and dangers of incorrect assembling are correspondingly reduced.

In assembling my improvement any suitable method may be followed. For instance the collar 9 or its equivalent is first combined with the post 5 or the latter is shaped or manipulated to produce the same, after which the sleeve 10 with the spring 12 contained therein is slipped over the end of the post 5 and the collar 9 or its equivalent. After this has been done the inner end of said sleeve 10 is turned inward to form the flange 11, it being understood that when the parts have been completely connected, the spring 12 will be confined between the collar 9 and the flange 13 located at the outer end of the sleeve 10.

In all of its forms whether in the shape of a collar, or wires or their equivalent or whether originally formed as an integral part of the post 5, my improved arrangement in its final condition includes either an integral annular projection of considerable axial width or a plurality of such projections suitably combined to provide an equivalent construction.

Various changes in the specific forms shown and described may be made within the scope of the claims without departing from the spirit of my invention.

I claim:—

1. A bracket comprising a post, bearing means rigidly fixed on said post, a sleeve having a continuous, uninterrupted inner surface, and being slidable throughout substantially its entire length upon said bearing means, said sleeve being held in a substantially fixed axial path by said bearing means alone and means whereby said sleeve is maintained in and returned to its normal position.

2. A bracket comprising a post, bearing means rigidly fixed on said post at a distance from its free end, a sleeve having an uninterrupted and continuous inner surface slidable on said bearing means, said sleeve normally projecting beyond the free end of said post and having its inner end in engagement with said bearing means and a spring whereby said sleeve is maintained in and returned to its normal position, said spring being located within said sleeve between its outer end and said bearing means.

3. A bracket comprising a post, a sleeve-like collar fixed upon said post at a distance from its free end, a sleeve having an uninterrupted and continuous inner surface slidable on said collar and being held thereby in a substantially fixed axial path, said sleeve in its normal position projecting beyond said free end of the post, means at the inner end of said sleeve engaging said collar in said normal position and limiting the outward movement of said sleeve, an inwardly extending projection at the outer end of said sleeve and a spring whereby said sleeve is maintained in and returned to its normal position, said spring being located within said sleeve between said projection and said collar.

In testimony whereof I have hereunto set my hand.

SIDNEY C. HILLS.

Copies of this patent may be obtained for five cents each, by addressing the "Commissioner of Patents, Washington, D. C."